Patented Feb. 20, 1951

2,542,484

UNITED STATES PATENT OFFICE 2,542,484

ALKALI RESISTANT PHENOLIC MOLDING POWDERS AND LAMINATE

Lawrence M. Debing, Springfield, and Rodney M. Huck, Longmeadow, Mass., assignors to Monsanto Chemical Company, St. Louis, Mo., a corporation of Delaware No Drawing. Application December 4, 1948, Serial No. 63,627

5 Claims. (Cl. 154—43)

This invention relates to phenolic molding powders and laminates containing cellulosic fillers and webs. More particularly, the invention relates to alkali-resistant phenolic molding powders and laminates containing cellulosic fillers and webs.

Phenolic resins as a general rule are acid-resistant, but are not alkali-resistant. However, it is possible to modify the phenolic resin with aniline or other amines to obtain increased alkali resistance. This increased alkali resistance is of no avail when using cellulosic fillers since the fillers are not alkali-resistant.

It is an object of this invention to provide a cellulose-filled, alkali-resistant phenolic molding powder.

A further object is to provide a process for preparing an alkali-resistant molding powder containing an alkali-resistant cellulosic filler.

Another object is to provide alkali-resistant phenolic laminates.

Still another object is to provide a process for preparing an alkali-resistant laminate from cellulosic webs.

These and other objects are attained by impregnating a cellulosic filler or web with an aqueous solution of a water-soluble, fusible melamine-formaldehyde resin, drying the impregnated material, curing the resin impregnated therein to the insoluble, infusible state, and incorporating the impregnated filler into an alkali-resistant phenolic molding powder or laminating the cellulosic web with an alkali-resistant phenolic laminating varnish.

The following examples are given in illustration and are not intended as limitations on the products and processes of this invention. Where parts are mentioned, they are parts by weight.

Example I

An aqueous solution of melamine resin was prepared by reacting 100 parts of melamine with 150 parts of formalin (37% formaldehyde) at pH of about 8–9 at reflux temperature and atmospheric pressure to form a water-soluble methylol melamine. The reaction product was diluted with 470 parts of water to obtain an aqueous solution containing about 20% solids.

To 100 parts of cotton flock were added 175 parts of the resin solution and the mixture was agitated until the flock was completely wet and had absorbed the resin solution. The wet flock was then dried in an oven at temperatures between 140–160° C. until the volatile content of the flock was approximately 3% by weight. It was found that the melamine resin was completely cured to an insoluble, infusible state during this drying process.

A solid fusible resin prepared by condensing 100 parts of phenol with 35 parts of aniline and 135 parts of formalin (37% formaldehyde) under alkaline conditions was granulated and mixed with the dried and cured filler in a ratio of 50 parts of resin to 50 parts of filler. The materials were first mixed dry at room temperature in a blending operation, and the blended mixture was then malaxated on a pair of heated rolls to provide a homogeneous sheet. The sheet was pulverized to obtain a molding powder. A washing machine agitator was molded from this molding powder and exposed to the action of alkali over an extended period of time. The agitator showed no deterioration either in strength or surface properties during the exposure to the alkali.

When a similar resin was compounded with an unmodified cotton flock filler and molded into a washing machine agitator, the agitator thus produced was rapidly attacked by mild alkali.

Example II

A cotton web was passed through an aqueous solution of a melamine resin prepared as shown in Example I. Excess solution was squeezed from the web which was then dried and cured at about 150° C. The resin pickup on the web was about 5% by weight based on the weight of the web.

Ten pieces cut from the cured web were impregnated with a laminating syrup derived from an aniline-modified phenol-cresol-formaldehyde condensation product prepared by condensing 50 parts of phenol, 50 parts of cresylic acid and 35 parts of aniline with 135 parts of formalin (37% formaldehyde) under alkaline conditions. Excess syrup was removed from the pieces, which were then dried, assembled into laminar relationship, and then heated at 140° C. under pressure to cure the resin. The resultant laminate was firmly bonded together and had a smooth, glossy surface. When exposed to mild alkali for an extended period, no deterioration occurred.

In producing the laminates, cellulosic webs such as cotton or paper webs are impregnated with from 3 to 10% by weight of a water-soluble melamine-formaldehyde resin which is then fully cured. The modified webs are then impregnated with from 50 to 60% by weight based on the weight of the web, of an alkali-resistant, amine-modified phenol-formaldehyde laminating resin.

The laminates are cured at temperatures from 100 to 160° C.

The phenolic resins of this invention are prepared by reacting a compound such as phenol, cresols, xylenols or mixtures of the same, with formaldehyde and aniline, toluidine, xylidines and other aromatic amines under alkaline conditions until a solid, brittle but fusible resin is obtained. This resin may be pulverized and used as a molding powder without modification with fillers, but the molded products obtained therefrom are extremely weak and brittle. In order to increase the strength of the products molded from this resin, it is preferred to compound a resin with from 50-100 parts of a cellulosic filler per 100 parts of resin. The filler may be a cotton flock as shown in the example or may be alpha flock, wood flour, ligno-cellulose, cotton fabric, cotton rags, nut shell flour and so forth.

If a laminate is to be prepared, the initial condensation of the phenolic resin is stopped before a brittle material is obtained, the reaction product is dehydrated and then cut with an organic solvent such as ethanol to obtain a laminating syrup.

The cellulosic fillers are not alkali-resistant and when compounded with the solid resin on milling rolls or in a mixer such as a Banbury mixer, they are only partially coated or impregnated with the resin and the uncoated or partially coated portion is easily attacked by alkali. The webs do not become thoroughly saturated with the normal laminating syrup in standard coating or impregnating operations, leaving many partially coated fibers which are easily attacked by alkali.

According to the process of this invention, the cellulosic fillers and webs are rendered alkali-resistant by impregnating them with a water solution of a soluble, fusible melamine-formaldehyde resin, removing the water by a drying operation and curing the resin to an insoluble, infusible state in the filler or web.

The melamine resin to be used for treating the cellulosic filler may be prepared by reacting 1 mol of melamine with from 2-6 and preferably from 2-4 mols of formaldehyde under alkaline conditions, the reaction being terminated prior to the development of a water-insoluble product. Preferably, the water-soluble reaction product is diluted with water until a solution containing between 10-30% solids is obtained. The impregnation of the cellulosic filler is a simple process of blending the filler with the amount of resin solution required to introduce sufficient resin into the filler to render it alkali-resistant. The wet filler is then freed from water by drying either at 100° C. or at higher temperatures, and the resin is cured in the filler at temperatures ranging from 140–160° C. It has been found possible to dry the impregnated filler or web in an oven or drier at temperatures between 140–160° C. without causing the impregnated fiber or web to mat together or to be stuck together by the resin. The cellulosic webs may be dipped in the aqueous melamine-formaldehyde resin solution and then passed through wringer rolls, or other conventional impregnating means may be used.

The compounding of the modified filler and the alkali resistant resin is accomplished by blending the ingredients at normal temperatures, such as room temperature, and when malaxating the blended material either on hot milling rolls, in heated Banbury mixers, or other conventional compounding equipment. The product of the compounding process is generally a sheet or a block which must be granulated or pulverized to obtain a molding powder. During the compounding process, other modifiers such as lubricants, dyes, pigments, mineral fillers, etc., may be added.

The products of this invention are particularly useful for molding or laminating into alkali-resistant articles such as washing machine agitators, rayon processing equipment, soap dispensers, etc., since the products have high impact resistance and toughness, coupled with outstanding resistance to alkali.

It is obvious that many variations may be made in the products and processes of this invention without departing from the spirit and scope thereof as defined in the appended claims.

What is claimed is:

1. An alkali-resistant molding powder comprising a mixture of a fusible aromatic amine-modified phenol-formaldehyde resin wherein the amine is taken from the group consisting of aniline, toluidine, xylidines, and a cellulosic filler which has previously been impregnated with a water solution of a water-soluble fusible melamine-formaldehyde condensation product, said impregnated filler having been dried and the melamine-formaldehyde condensation product having been cured to the insoluble infusible state therein.

2. A process for preparing an alkali-resistant molding powder which comprises impregnating a cellulosic filler with a water solution of a water-soluble fusible melamine-formaldehyde condensation product, drying the impregnated filler and curing the melamine resin therein to an insoluble infusible state, and then compounding the filler with a fusible aromatic amine-modified phenol-formaldehyde resin wherein the aromatic amine is taken from the group consisting of aniline, toluidine and xylidines.

3. An alkali-resistant article comprising a cellulosic material and an alkali-resistant phenolic resin prepared from formaldehyde, an aromatic amine taken from the group consisting of aniline, toluidine, and xylidines, and at least one member of the group consisting of phenol, cresols and xylenol, said cellulosic material having been impregnated with a water solution of a water-soluble fusible melamine-formaldehyde condensation product and then dried and heated to cure the melamine resin to an insoluble infusible state prior to the incorporation of the cellulosic material with the phenolic resin.

4. An alkali-resistant laminate prepared by impregnating a cellulosic web with a water solution of a water-soluble fusible melamine-formaldehyde condensation product, drying said web and curing said melamine resin in the web to the insoluble infusible state and then laminating sections of said web together with an alkali-resistant phenolic laminating varnish prepared from formaldehyde, an aromatic amine taken from the group consisting of aniline, toluidine and xylidines and at least one compound taken from the group consisting of phenol, cresols and xylenols.

5. An alkali-resistant laminate prepared by impregnating a cellulosic web with a water solution of a water-soluble fusible melamine-formaldehyde condensation product, drying said web and curing said melamine resin in the web to the insoluble infusible state, the amount of melamine resin being equivalent to from 3% to 10% by weight of the cellulosic web, and then laminating sections of said web together with an alkali-resistant phenolic laminating varnish prepared from formaldehyde, an aromatic amine taken from the group consisting of aniline, toluidine and xylidines and at least one compound taken from the group consisting of phenol, cresols and xylenols.

LAWRENCE M. DEBING.
RODNEY M. HUCK.

REFERENCES CITED

The following references are of record in the file of this patent:

UNITED STATES PATENTS

| Number | Name | Date |
|---|---|---|
| 2,456,006 | Kickler | Dec. 14, 1948 |

FOREIGN PATENTS

| Number | Country | Date |
|---|---|---|
| 557,558 | Great Britain | Nov. 25, 1943 |
| 611,216 | Great Britain | Oct. 27, 1948 |